(12) United States Patent
Sung et al.

(10) Patent No.: US 9,034,420 B2
(45) Date of Patent: May 19, 2015

(54) TOUCH SCREEN SUBSTRATE AND METHOD OF MANUFACTURING A TOUCH SCREEN SUBSTRATE

(71) Applicant: SAMSUNG DISPLAY CO., LTD., Yongin, Gyeonggi-Do (KR)

(72) Inventors: Woo-Yong Sung, Seoul (KR); Tae-Woon Cha, Seoul (KR); Tae-Gyun Kim, Seoul (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 0 days.

(21) Appl. No.: 14/036,269

(22) Filed: Sep. 25, 2013

(65) Prior Publication Data

US 2014/0023778 A1  Jan. 23, 2014

Related U.S. Application Data

(62) Division of application No. 12/909,514, filed on Oct. 21, 2010, now Pat. No. 8,580,352.

(30) Foreign Application Priority Data

Dec. 7, 2009  (KR) ........................ 10-2009-0120396

(51) Int. Cl.
  *G06F 3/045* (2006.01)
  *G06F 3/041* (2006.01)
(52) U.S. Cl.
  CPC .............. *G06F 3/045* (2013.01); *G06F 3/0412* (2013.01); *G06F 2203/04103* (2013.01)

(58) Field of Classification Search
  CPC ............ G02F 1/13392; G02F 1/13394; G06F 3/0412; G06F 3/045; G06F 2203/04103
  USPC ..................................................... 427/58, 110
  See application file for complete search history.

(56) References Cited

U.S. PATENT DOCUMENTS

| | | | |
|---|---|---|---|
| 5,062,198 A * | 11/1991 | Sun ................................ | 29/622 |
| 6,933,064 B2 * | 8/2005 | Anderson et al. ............. | 428/690 |
| 7,369,122 B2 | 5/2008 | Cross et al. | |
| 7,413,765 B2 | 8/2008 | Ito et al. | |

(Continued)

FOREIGN PATENT DOCUMENTS

| CN | 1892317 | 1/2007 |
|---|---|---|
| CN | 101359112 | 2/2009 |

(Continued)

OTHER PUBLICATIONS

English Abstract for Publication No. 07-037466.

(Continued)

*Primary Examiner* — Elena T Lightfoot
(74) *Attorney, Agent, or Firm* — F. Chau & Associates, LLC

(57) ABSTRACT

A method of manufacturing a touch screen substrate includes forming a sensing electrode on a substrate, spraying a first ink and a second ink on the substrate including the sensing electrode, where the first ink includes a first solvent and insulation balls having a first diameter and the second ink includes a second solvent and conductive balls having a second diameter smaller than the first diameter, and hardening the first and second inks on the substrate, to fix the insulation balls on the substrate and the conductive balls on the sensing electrode formed on the substrate.

5 Claims, 13 Drawing Sheets

(56) References Cited

U.S. PATENT DOCUMENTS

| | | | |
|---|---|---|---|
| 2004/0090429 A1 | 5/2004 | Geaghan et al. | |
| 2007/0097278 A1 | 5/2007 | Rho et al. | |
| 2007/0263165 A1* | 11/2007 | Sung et al. | 349/187 |

FOREIGN PATENT DOCUMENTS

| | | |
|---|---|---|
| JP | 07-037466 | 2/1995 |
| JP | 2004-139162 | 5/2004 |
| JP | 2004-267874 | 9/2004 |
| JP | 2005-267464 | 9/2005 |
| JP | 2007-052209 | 3/2007 |
| KR | 10-2004-0065263 | 7/2004 |
| KR | 10-2005-0063803 | 6/2005 |
| KR | 10-0583291 | 5/2006 |
| KR | 1020070108982 | 11/2007 |
| KR | 10-0836869 | 6/2008 |
| KR | 10-0873268 | 12/2008 |
| KR | 10-2009-0000845 | 1/2009 |
| KR | 10-2009-0032573 | 4/2009 |

OTHER PUBLICATIONS

English Abstract for Publication No. 2004-139162.
English Abstract for Publication No. 10-2004-0065263.
English Abstract for Publication No. 2004-267874.
English Abstract for Publication No. 10-2005-0063803.
English Abstract for Publication No. 2005-267464.
English Abstract for Publication No. 10-2004-0079854 (for 10-0583291).
English Abstract for Publication No. 2007-052209.
English Abstract for Publication No. 10-2007-0108982.
Englisfi Abstract for Publication No. 10-2008-0025534 (10-0836869).
English Abstract for Publication No. 10-2007-0021065 (10-0873268).
English Abstract for Publication No. 10-2009-0000845.
English Abstract for Publication No. 10-2000-0032573.

* cited by examiner

TOUCH SCREEN SUBSTRATE AND METHOD OF MANUFACTURING A TOUCH SCREEN SUBSTRATE

CROSS REFERENCE TO RELATED APPLICATIONS

This application claims priority from, and is a divisional of U.S. application Ser. No. 12/909,514 of Sung, et al., filed in the U.S. Patent and Trademark Office on Oct. 21, 2010, which in turn claims priority under 35 U.S.C. §119 from Korean Patent Application No. 2009-120396, filed on Dec. 7, 2009 in the Korean Intellectual Property Office (KIPO), the contents of both of which are herein incorporated by reference in their entireties.

BACKGROUND OF THE INVENTION

1. Field of the Invention

Exemplary embodiments of the present invention are directed to a touch screen substrate and a method of manufacturing a touch screen substrate. More particularly, exemplary embodiments of the present invention are directed to a touch screen substrate of a resistive type and a method of manufacturing a touch screen substrate.

2. Description of the Related Art

In general, a display panel includes a display substrate having a signal line, a thin-film transistor (TFT) and a pixel electrode, an opposing substrate facing the display substrate, and a display element interposed between the display substrate and the opposing substrate. For example, the display element may include liquid crystals controlling the light transmittance according to a direction and/or an intensity of an electric field. The display panel may further include a cell gap spacer which maintains a cell gap between the display substrate and the opposing substrate.

The display panel may function as a touch panel which recognizes position data via sensing an outer pressure. A display substrate of a display panel functioning as a touch panel further includes a first sensing electrode and a sensor line separated from the signal line. The sensor line is spaced apart from the signal line, and the first sensing electrode is connected to the sensor line. When an outer pressure is applied to the opposing substrate, a second sensing electrode connected to a common electrode of the opposing substrate contacts the first sensing electrode, and then position data of a contact point are transmitted to a central processing unit through the sensor line. The display substrate of the display panel functioning as a touch panel further includes a touch spacer having a height lower than the cell gap spacer. Either the first sensing electrode or the second sensing electrode may be formed on the touch spacer to easily make contact with the first sensing electrode and the second sensing electrode under a relatively low pressure condition. Thus, touch sensitivity may be enhanced.

In general, the touch spacer is formed by a photolithography process similar to the process for forming the cell gap spacer. An electrode layer is formed on a substrate including the cell gap spacer and the touch spacer, and then the sensor line formed on the cell gap spacer is insulated from the common electrode. To insulate the sensor line and the common electrode, the electrode layer is patterned, a first insulation pattern is formed between the electrode layer and the sensor line, or a second insulation pattern is formed between the electrode layer and the common electrode. However, the above-mentioned insulating method includes forming a plurality of layers and patterning the layers, and performing a photolithography process for at least once, and thus the method of manufacturing the display panel has a relatively long manufacturing time that increases the manufacturing cost of the display panel.

SUMMARY OF THE INVENTION

Exemplary embodiments of the present invention provide a touch screen substrate capable of improving productivity.

Exemplary embodiments of the present invention also provide a method of manufacturing a touch screen substrate capable of simplifying a manufacturing process.

According to an exemplary embodiment of the present invention, a touch screen substrate includes an insulation ball, a sensing electrode and a conductive ball. The insulation ball has a first diameter. The conductive ball is formed on the sensing electrode. The conductive ball has a second diameter shorter than the first diameter.

In an exemplary embodiment, the conductive ball may be fixed on the substrate by a first hardener formed around a first point of contact with the sensing electrode, and the insulation ball is fixed on the substrate by a second hardener formed around a second point of contact with the substrate.

In an exemplary embodiment of the present invention, a touch screen substrate includes a first spacer, a sensing electrode and a second spacer in contact with the sensing electrode. The first spacer has a first height and the second spacer has a second height less than the first height.

In an exemplary embodiment, the first spacer is formed from a hardened photosensitive insulating ink and the second spacer is formed from a hardened photosensitive conducting ink.

In an exemplary embodiment, the first and second spacers are formed from a photosensitive insulating ink, and the sensing electrode is formed on the second spacer.

According to another exemplary embodiment of the present invention, there is provided a method of manufacturing a touch screen substrate. In the method, a sensing electrode is formed on a substrate. A first ink and a second ink are sprayed on the substrate including the sensing electrode. The first ink includes a first solvent and insulation balls having a first diameter and the second ink includes a second solvent and conductive balls having a second diameter shorter than the first diameter. The first and second inks are hardened on the substrate to fix the insulation balls and the conductive balls onto the substrate, and the conductive ball is disposed on the sensing electrode.

In an exemplary embodiment, the first and second inks may be sprayed from an assembly including a first print head filled with the first ink and a second print head filled with the second ink. The assembly may move over the substrate for spraying the first and second inks According to still another exemplary embodiment of the present invention, there is provided a method of manufacturing a touch screen substrate. In the method, a sensing electrode making contact with the second spacer is formed on a substrate, and a first ink and a second ink having a same amount of ink as the first ink are sprayed on the substrate. Light is irradiated upon the first ink and the second ink to form a first spacer having a first height and a second spacer having a second height lower than the first height. A light intensity provided to the first ink is different from a light intensity provided to the second ink.

In an exemplary embodiment, the first ink may be a photosensitive insulator and the second ink may be a photo-sensitive conductor.

In an exemplary embodiment, each of the first and second inks may be a photo-sensitive insulator. Here, the sensing electrode may be formed on the second spacer.

According to embodiments of the present invention, the cell gap spacer and the touch spacer for sensing an outer pressure are formed by the same process, improving manufacturing productivity of a touch screen panel. In addition, the spherically shaped insulation balls and conductive balls used for the cell gap spacer and the touch spacer enhance the touch sensitivity of the touch screen panel.

DETAILED DESCRIPTION OF EXEMPLARY EMBODIMENTS

Figure 1:
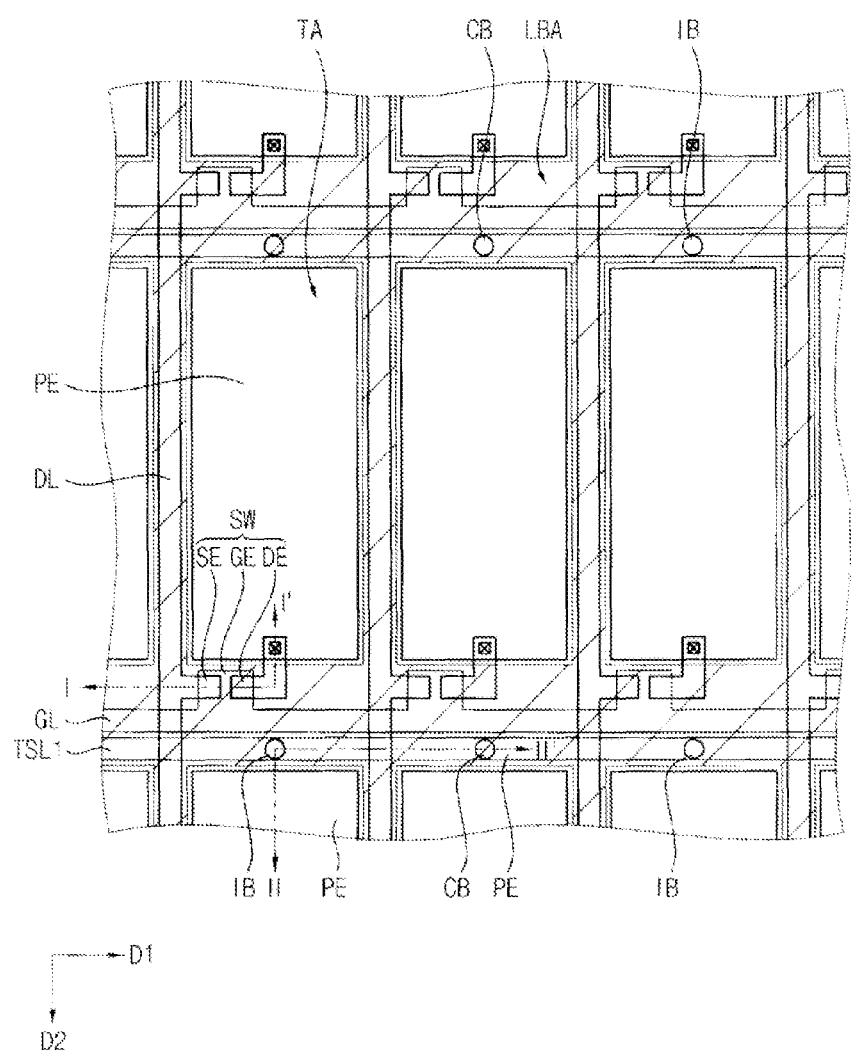
FIG. 1 is a plan view illustrating a touch screen panel according to an exemplary embodiment of the present invention.

Embodiments of the present invention are described more fully hereinafter with reference to the accompanying drawings, in which exemplary embodiments of the present invention are shown. Embodiments of the present invention may, however, take many different forms and should not be construed as limited to the exemplary embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. Like numerals refer to like elements throughout.

Hereinafter, exemplary embodiments of the present invention will be explained in detail with reference to the accompanying drawings.

Figure 2:
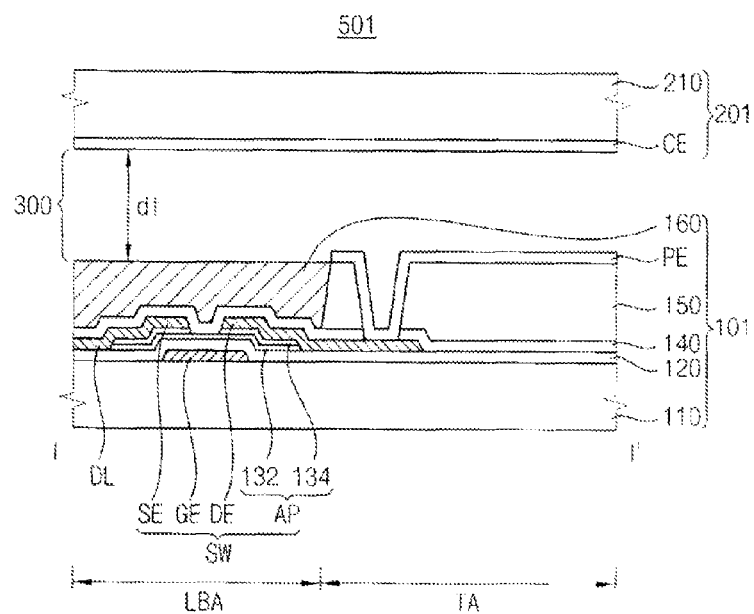
FIG. 2 is a cross-sectional view taken along a line I-I' of FIG. 1.

FIG. 1 is a plan view illustrating a touch screen panel according to an exemplary embodiment of the present invention. FIG. 2 is a cross-sectional view taken along a line I-I' of FIG. 1.

Referring to FIGS. 1 and 2, a touch screen panel 501 according to an exemplary embodiment includes a first touch screen substrate 101 as a lower substrate, a second touch screen substrate 201 as an upper substrate, a liquid crystal layer 300 interposed between the first and second touch screen substrates 101 and 201, insulation balls IB and conductive balls CB. The first and second touch screen substrates 101 and 201 are spaced apart from each other by a predetermined distance. The distance between the first and second touch screen substrates 101 and 201 is defined as a cell gap "dt" of the first touch screen panel 501.

The first touch screen substrate 101 includes a first base substrate 110, a plurality of signal lines including a gate line GL and a data line DL, a thin-film transistor (TFT) SW, a color filter 150, a black matrix pattern 160, a first sensor line TSL1, a first sensing electrode TSE1 (see FIG. 3, described below), and a pixel electrode PE. The color filter 150 and the pixel electrode PE are formed on a first base substrate 110 and in a light transmission region TA of the touch screen panel 501. The gate line GL, the data line DL, the TFT SW, the black matrix pattern 160, the first sensor line TSL1 and the first sensing electrode TSE1 are fowled on the first base substrate 110 and in a light blocking region LBA surrounding the light transmission region TA of the touch screen panel 501. The insulation balls TB and the conductive balls CB are disposed between the first base substrate 110 and the second base substrate 210 in the light blocking region LBA.

The gate line GL extends in a first direction D1 of the first touch screen panel 501, and the data line DL extends in a second direction D2 crossing the first direction D1.

The TFT SW includes a gate electrode GE connected to the gate line GL, a source electrode SE connected to the data line DL, a drain electrode DE spaced apart from the source electrode SE, and an active pattern AP. The active pattern AP includes a semiconductor layer 132 which is formed on a gate insulation layer 120 covering the gate electrode GE and an ohmic contact layer 134 disposed on the semiconductor layer 132. An end portion of the drain electrode DE extends to the light transmission region TA so that the drain electrode DE is electrically connected to the pixel electrode PE. The TFT SW is protected by a passivation layer 140 formed on the TFT SW.

The color filter 150 is formed on the passivation layer 140 in the light transmission region TA. The color filter 150 transmits light provided from a backside of the first base substrate 110 so that a viewer perceives color through the second touch screen substrate 201. The color filter 150 includes a hole partially exposing the drain electrode DE, and the drain electrode DE is electrically connected to the pixel electrode PE through the hole.

The black matrix pattern 160 is formed on the passivation layer 140 in the light blocking region LBA. For example, the black matrix pattern 160 is formed on the first base substrate 110 over regions corresponding to the gate line GL, the data line DL and the TFT SW.

The first sensor line TSL1 may be formed on the black matrix pattern 160. The first sensor line TSL1 extends in the first direction D1. The first sensor line TSL1 is spaced apart in the second direction D2 from the gate line GL.

The first sensing electrode TSE1 is connected to the first sensor line TSL1. When the first sensing electrode TSE1 senses pressure, position data are output to a central processing unit (not shown) which is connected to the touch screen panel 501 via the first sensor line TSL1. Adjacent first sensing electrodes TSE1 are electrically connected to each other by the first sensor line TSL1.

The pixel electrode PE is formed on the color filter layer 150. The first sensor line TSL1 and the first sensing electrode TSE1 are formed from a same layer as the pixel electrode PE. The first sensor line TSL1 and the first sensing electrode TSE1 are spaced apart from and electrically separated from the pixel electrode PE.

The second touch screen substrate 201 includes a common electrode CE and a second sensing electrode TSE2 (see FIG. 3, described below) which are formed on the second base substrate 210 facing the first base substrate 110. The second sensing electrode TSE2 is formed on the second base substrate 210 in the light blocking region LBA. The common electrode CE is formed on the second base substrate 210 in the light transmission region TA and the light blocking region LBA except a region corresponding to the second sensing electrode TSE2.

Alternatively, although not shown in the figure, when the pixel electrode PE includes a first opening portion for forming a domain of liquid crystals, the common electrode CE may include a second opening portion.

The second sensing electrode TSE2 is formed in the light blocking region LBA and is connected to the common electrode CE. The second sensing electrode TSE2 is integrally formed with the common electrode CE to be substantially a portion of the common electrode CE. Functionally, a portion of the common electrode making contact with the first sensing electrode TSE1 is defined as the second sensing electrode TSE2. The second sensing electrode TSE2 is formed from a same layer as the common electrode CE. The second sensing electrode TSE2 will be described in detail with reference to FIG. 3.

Hereinafter, the first and second sensing electrodes TSE1 and TSE2, the first sensor line TSL1, the insulation balls IB and the conductive balls CB will be described in detail referring to FIG. 3.

Figure 3:
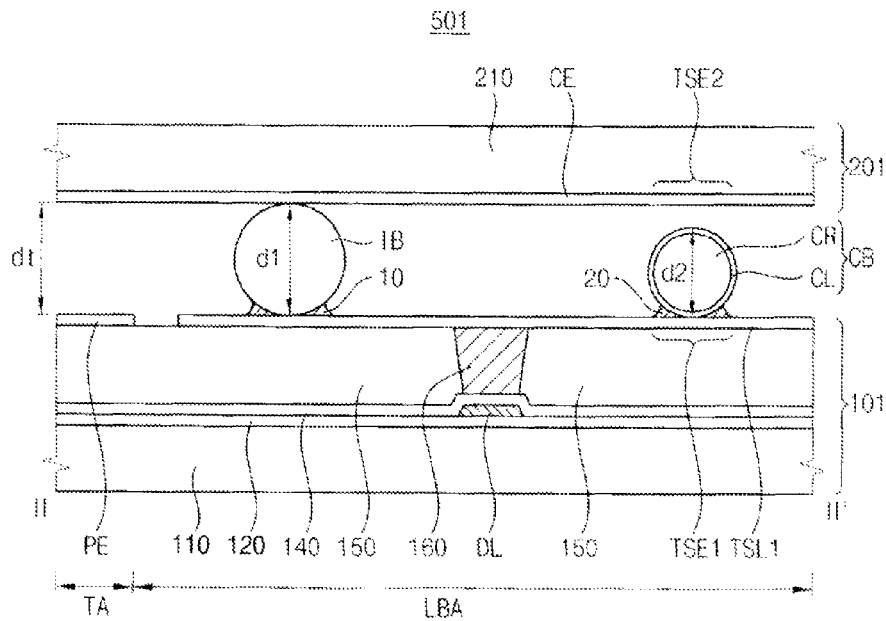
FIG. 3 is a cross-sectional view taken along a line II-II' of FIG. 1.

FIG. 3 is a cross-sectional view taken along a line II-II' of FIG. 1.

Referring to FIG. 3, the insulation ball IB and the conductive ball CB are interposed between the first and second base substrates 110 and 210 in the light blocking region LBA. For example, the insulation ball TB and the conductive ball CB are disposed on the first base substrate 110 in the light blocking region LBA.

The insulation ball IB has a first diameter $d_1$, a spherical shape and insulating properties. The first diameter $d_1$ may be substantially the same as the cell gap "dt." The cell gap "dt" may be uniformly maintained by the insulation ball IB. The insulation ball IB may be disposed on the first sensor line TSL1. The insulation ball IB makes contact with the first sensor line TSL1 and the common electrode CE. A first portion of the insulation ball IB makes contact with the first sensor line TSL1, and a second portion opposite to the first portion of the insulation ball IB makes contact with the common electrode CE. Since the insulation ball IB has the insulating properties, the first sensor line TSL1 is not electrically connected to the common electrode CE although the insulation ball IB is interposed between the first sensor line TSL1 and the common electrode CE.

The insulation ball IB is fixed on the first touch screen substrate 101 by a first hardener 10 which is formed around a first contact point between the insulation ball TB and the first sensor line TSL1. The first hardener 10 is formed around the first contact point when the insulation ball IB is disposed on the first touch screen substrate 101.

The conductive ball CB is formed on the first sensing electrode TSE1. The conductive ball CB has a second diameter $d_2$, a spherical shape and conductive properties. For example, the conductive ball CB may include a core CR formed from an insulation resin and a conductive layer CL surrounding the core CR. Alternatively, the conductive ball CB may include a metal core having conductive properties so that the conductive ball CB has conductive properties in itself. The second diameter $d_2$ is less than the first diameter $d_1$. For example, the second diameter $d_2$ may be in a range between about 95% and about 75% of the first diameter $d_1$. When the conductive ball CB includes the core CR and the conductive layer CL, the second diameter $d_2$ may be substantially the same as the sum of a diameter of the core CR and twice the thickness of the conductive layer CL. Since the second diameter $d_2$ is less than the first diameter $d_1$, the conductive ball CB makes contact with the first sensing electrode TSE1 and the conductive ball CB is spaced apart from the second sensing electrode TSE2. When an outer pressure is applied to the touch screen panel 501, the second sensing electrode TSE2 makes contact with the conductive ball CB so that the first sensing electrode TSE1 becomes electrically connected to the second sensing electrode TSE2. The first and second sensing electrodes TSE1 and TSE2 are electrically connected each other by the conductive ball CB. Therefore, the first and second touch screen substrates 101 and 201 may be electrically connected to each other.

The conductive ball CB is fixed on the first touch screen substrate 101 by a second hardener 20 which is formed around a second contact point between the conductive ball CB and the first sensing electrode TSE1. The second hardener 20 is formed around the second contact point when the conductive ball CB is disposed on the first touch screen substrate 101.

Since both the insulation ball IB and the conductive ball CB are spherically shaped for desirable elastic properties and/or restoring forces, the touch screen panel 501 may easily restore itself to an unpressured state from the pressured state resulting from the application of outer pressure. In addition, the first and second sensing electrodes TSE1 and TSE2 easily contact each other, enhancing the touch sensitivity of the touch screen panel.

Hereinafter, a method for manufacturing the touch screen panel 501 according to an exemplary embodiment illustrated in FIGS. 1, 2 and 3 will be described referring to FIGS. 2, 3 and 4.

Figure 4:
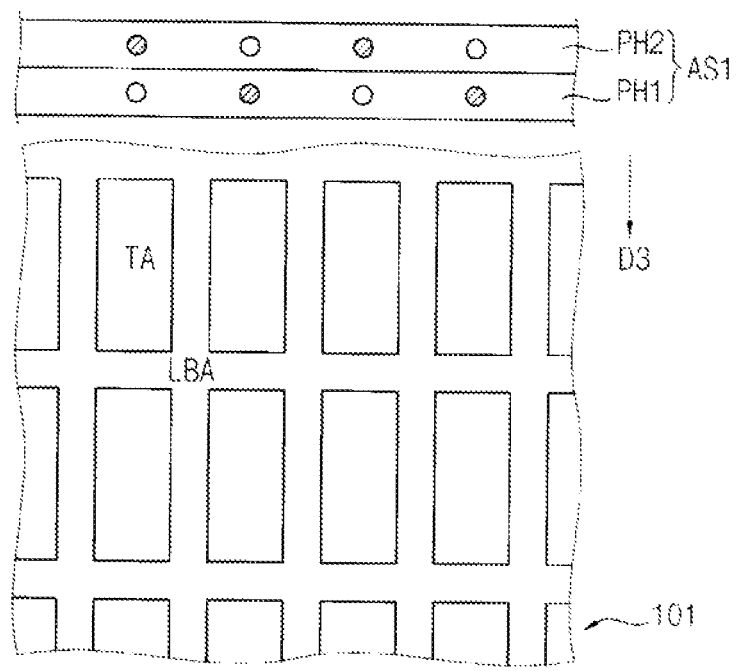
FIG. 4 is a plan view illustrating a method of manufacturing a touch screen substrate of FIG. 3.

FIG. 4 is a plan view illustrating a method for manufacturing a first touch screen substrate of FIG. 3.

First, referring to FIGS. 2 and 3, a gate pattern including the gate line GL and the gate electrode GE is formed on the first base substrate 110 and in the light blocking region LBA. A gate metal layer is patterned via a photolithography process to form the gate pattern. The gate insulation layer 120 and the active pattern AP are sequentially formed on the first base substrate 110 including the gate pattern. A source pattern including the data line DL, the source and drain electrodes SE and DE is formed on the first base substrate 110 including the active pattern AP in the light blocking region LBA. A source metal layer is patterned via a photolithography process to form the source pattern. The passivation layer 140 is formed on the first base substrate 110 including the source pattern, and the color filter 150 is formed on the passivation layer 140 in the light transmission region TA. The black matrix pattern 160 is formed on the passivation layer 140 in the light blocking region LBA.

A transparent electrode layer is formed on the first base substrate 110 including the color filter 150 and the black matrix pattern 160. For example, the transparent electrode layer may include indium tin oxide (ITO) or indium zinc oxide (IZO). The transparent electrode layer is patterned via a photolithography process to form the pixel electrode PE in the light transmission region TA and to form the first sensor line TSL1 and the first sensing electrode TSE1 in the light blocking region LBA.

The insulation balls IB and the conductive balls CB are disposed on the touch screen substrate 101 including the pixel electrode PE, the first sensor line TSL1 and the first sensing electrode TSE1.

Referring to FIG. 4, a first print assembly AS1 is disposed over the first touch screen substrate 101 including the pixel electrode PE, the first sensor line TSL1 and the first sensing electrode TSE1. The first print assembly AS1 moves over the first touch screen substrate 101 along a third direction D3 to dispose the insulation balls IB and the conductive balls CB on the first touch screen substrate 101. The third direction D3 may be substantially the same as either the first direction D1 or the second direction D2. In the present exemplary embodiment, the third direction D3 is substantially the same as the second direction D2.

The first print assembly AS1 includes a first print head PH1 and a second print head PH2. Each of the first and second print heads PH1 and PH2 includes a plurality of nozzles, and each of the nozzles may spray ink on the first touch screen substrate 101. The first print head PH1 is filled with a first ink including the insulation balls IB and a first solvent. The first solvent may include distilled water, glycerin, surfactants, etc. The insulation balls IB, being solids, are dispersed in the first solvent so that the insulation balls IB may be disposed on the first touch screen substrate 101 by spraying the first ink through the nozzles. The second print head PH2 is filled with a second ink including the conductive balls CB and a second solvent. The second solvent may also include distilled water, glycerin, surfactants, etc. The conductive balls CB, also being solids, are dispersed in the second solvent so that the conductive balls CB may be disposed on the first touch screen substrate 101 by spraying the second ink through the nozzles. An interval between spraying the first ink of the first print head PH1 and spraying the second ink of the second print head PH2 is controlled so that the first print assembly AS1 passes over the light transmission region TA and sprays the first and second inks onto the light blocking region LBA.

A nozzle pitch of each of the first and second print heads PH1 and PH2 may be defined as a distance between centers of the light transmission regions TA adjacent to each other. When the odd-numbered nozzles of the first print head PH1 are open and even-numbered nozzles of the first print head PH1 are closed, the first ink may be sprayed on the first touch screen substrate 101. At the same time, when even-numbered nozzles of the second print head PH2 are open and odd-numbered nozzles of the second print head PH2 are closed, then the second ink may be sprayed on the first touch screen substrate 101. Therefore, the insulation balls IB or the conductive balls CB may be arranged in the second direction D2.

Although not shown in the figures, if the nozzle pitch is twice the distance between centers of the light transmission regions TA adjacent to each other, the nozzles of the first print head PH1 and the nozzles of the second print head PH2 may be alternately disposed with each other. The odd-numbered nozzles of the second print head PH2 may be disposed adjacent to the even-numbered nozzles of the first print head PH1.

Hereinafter, a process for fixing the insulation balls IB and the conductive balls CB on the first touch screen substrate 101 after spraying the insulation balls IB and the conductive balls CB on the first touch screen substrate 101 will be described in detail, referring to FIGS. 5A and 5B.

Figure 5A:
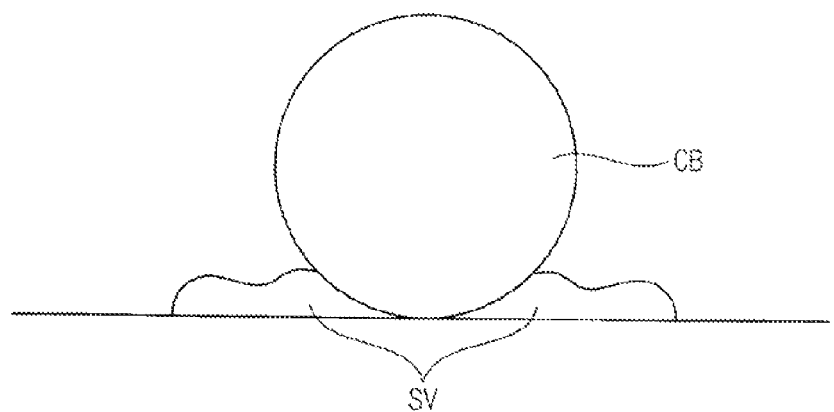
FIGS. 5A and 5B are schematic views illustrating a process for forming an insulation ball and a conductive ball of FIG. 3.
Figure 5B:
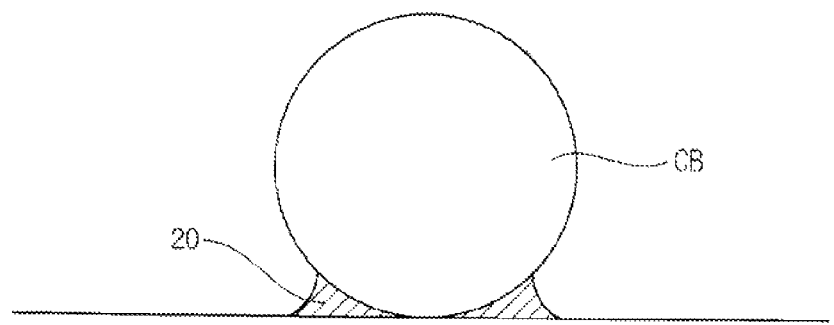

FIGS. 5A and 5B are schematic views illustrating a process for forming an insulation ball and a conductive ball of FIG. 3.

Referring to FIG. 5A, when the second ink is sprayed on the first sensing electrode TSE1 by the second print head PH2, the conductive ball CB and the second solvent SV are disposed on the first sensing electrode TSE1. The second solvent SV is disposed around the second contact point between the conductive ball CB and the first sensing electrode TSE1 due to viscosity of the second solvent SV and/or gravitational force between the conductive ball CB and the second solvent SV.

Referring to FIG. 5B, most of the second solvent SV evaporates in a fixing process, although some of second solvent SV remains around the second contact point. The fixing process may be performed by either heating the first touch screen substrate 101 or irradiating light onto the first touch screen substrate 100. The remaining second solvent SV is hardened during the fixing process to form the second hardener 20 around the second contact point.

In the present exemplary embodiment, the second hardener 20 is formed via an additional fixing process. Alternatively, when the second ink sprayed on the first touch screen substrate 101 is left alone for a predetermined time, most of the second solvent SV evaporates into the air and the remaining second solvent SV partially hardens to form the second hardener 20.

The first hardener 10 may be also formed around the first contact point between the insulation ball IB and the first sensor line TSL1 in the same way as the second hardener 20 is formed, as illustrated in FIGS. 5A and 5B.

Thus, the insulation balls IB and the conductive balls CB are fixed on the first touch screen substrate 101.

After the liquid crystals are disposed on the first touch screen substrate 101 including the insulation balls IB and the conductive balls CB, the first touch screen substrate 101 may be combined with the second touch screen substrate 201 including the common electrode CE and the second sensing electrode TSE2. Accordingly, the touch screen panel 501 including the insulation balls IB and the conductive balls CB interposed between the first and second touch screen substrates 101 and 201 is manufactured.

According to the present exemplary embodiment, the insulation balls IB and the conductive balls CB are formed via a single process using the first and second inks, simplifying a method of manufacturing the touch screen panel 501 as compared to a photolithography process. Further, by using the insulation balls IB and the conductive balls CB, the first sensor line TSL1 and the common electrode CE will not be electrically connected to each other by the independent processes of patterning the first sensor line TSL1 and patterning the common electrode CE.

Furthermore, the first touch screen panel 501 may easily restore itself to an unpressured state from a pressured state resulting from the application of outer pressure. Therefore, the first and second sensing electrodes TSE1 and TSE2 may easily contact each other, enhancing the touch sensitivity of the touch screen panel 501.

Figure 6:
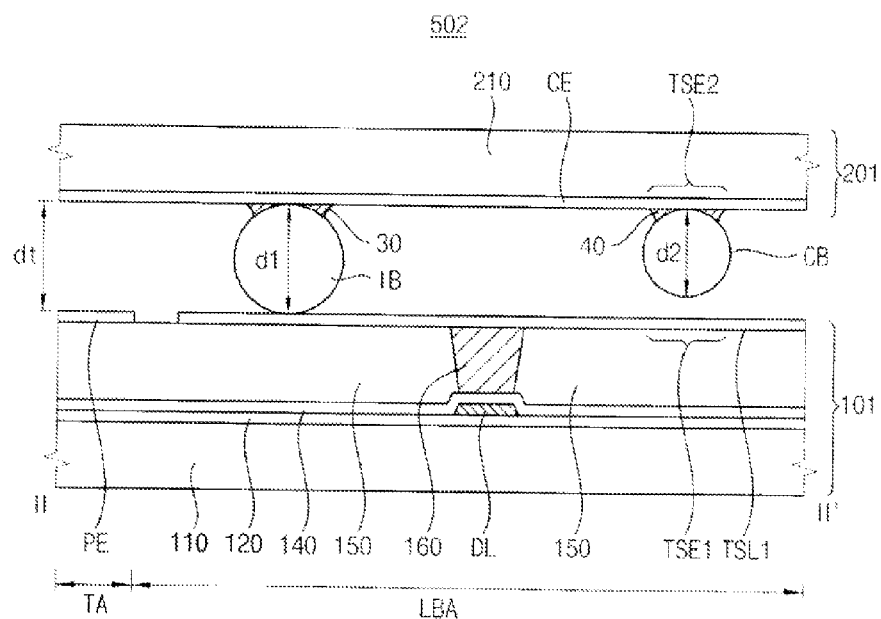
FIG. 6 is a cross-sectional view illustrating a touch screen panel according to another exemplary embodiment of the present invention.

FIG. 6 is a cross-sectional view illustrating a touch screen panel according to another exemplary embodiment of the present invention.

Referring to FIG. 6, a touch screen panel 502 according the present exemplary embodiment includes a first touch screen substrate 101 as a lower substrate, a second touch screen substrate 201 as an upper substrate, a liquid crystal layer interposed between the first and second touch screen substrates 101 and 201, insulation balls IB and conductive balls CB.

The first touch screen substrate 101 includes signal lines, such as a data line DL, a TFT SW, a color filter 150, a black matrix pattern 160, a first sensor line TSL1, a first sensing electrode TSE1 and a pixel electrode PE1. The second touch screen substrate 201 includes a second sensing electrode TSE2 and a common electrode CE. The touch screen panel 502 according to the present exemplary embodiment is substantially the same as the touch screen panel 501 according to the exemplary embodiment illustrated in FIGS. 1 to 3, except that the insulation balls IB and the conductive balls CB are formed on the second touch screen substrate 201. Thus, any further repetitive description will be omitted.

The insulation balls IB are interposed between the common electrode CE and the first sensor line TSL1. The insulation balls IB make contact with both the common electrode CE and the first sensor line TSL1. The insulation balls IB are fixed on the second touch screen substrate 201 by a third hardener 30 which is formed around a third contact point between the common electrode CE and each insulation ball IB.

The conductive balls CB are interposed between the first and second sensing electrodes TSE1 and TSE2. The conductive balls CB make contact with the second sensing electrode TSE2 and are spaced apart from the first sensing electrode TSE1. The conductive balls CB are fixed on the second touch screen substrate 201 by a fourth hardener 40 which is formed around a fourth contact point between the second sensing electrode TSE2 and each conductive ball CB. When an outer pressure is applied to the second touch screen panel 502, the conductive ball CB makes contact with the first sensing electrode TSE1 so that the first sensing electrode TSE1 becomes electrically connected to the second sensing electrode TSE2. The first and second sensing electrodes TSE1 and TSE2 are electrically connected to each other via the conductive ball CB.

Hereinafter, a method of manufacturing a touch screen panel 502 according to the present exemplary embodiment will be described, referring to FIGS. 6 and 7.

A method of manufacturing a touch screen panel 502 according the present exemplary embodiment is substantially the same as a method of manufacturing the touch screen panel 501 according to the exemplary embodiment in FIGS. 4 to 5B, except that the insulation balls IB and the conductive balls CB are formed on the second touch screen substrate 201. Thus, any further repetitive description will be omitted.

Figure 7:
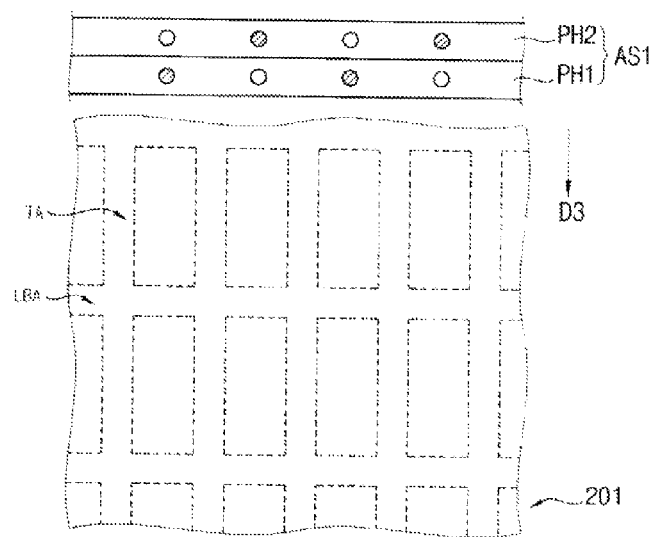
FIG. 7 is a plan view illustrating a method of manufacturing a touch screen substrate of FIG. 6.

FIG. 7 is a plan view illustrating a method of manufacturing a touch screen substrate of FIG. 6.

Referring to FIGS. 6 and 7, a first print assembly AS1 is disposed over the second touch screen substrate 201 including the common electrode CE and the second sensing electrode TSE2. The first print assembly AS1 moves over the second touch screen substrate 201 in a third direction D3 to dispose the insulation balls IB and the conductive balls CB on the second touch screen substrate 201.

The insulation balls IB are formed on a light blocking region LBA of the second touch screen substrate 201 facing the first sensor line TSL1. The conductive balls CB are formed in the light blocking region LBA of the second base substrate 210 facing the first sensing electrode TSE1. Although the second touch screen substrate 201 does not include a light blocking pattern, such as the signal lines or the black matrix pattern 160 formed on the first touch screen substrate 101, regions facing the signal lines and the TFT SW of the first touch screen substrate 101 are defined as the light blocking region LBA of the second touch screen substrate 201. The insulation balls IB and the conductive balls CB are formed on the second base substrate 210 in the light blocking region LBA.

The third hardener 30 is formed around the third contact point between the insulation balls IB and the common electrode CE via a fixing process. The fourth hardener 40 is formed around the fourth contact point between the conductive balls CB and the second sensing electrode TSE2 via the fixing process. Thus, the insulation balls IB and the conductive balls CB are fixed on the second touch screen substrate 201. The process of forming the third and fourth hardeners 30 and 40 according to the present exemplary embodiment is substantially the same as the process of forming the second hardener 20 according to the exemplary embodiment in FIGS. 5A and 5B except that the third and fourth hardeners 30 and 40 are formed on the second touch screen substrate 201. Thus, any further repetitive description will be omitted.

Then, after liquid crystals are disposed on the second touch screen substrate 201 including the insulation ball IB and the conductive ball CB, the second touch screen substrate 201 may be combined with the first touch screen substrate 101 including the first sensor line TSL1 and the first sensing electrode TSE1. Accordingly, the touch screen panel 502 according to the present exemplary embodiment is manufactured.

Figure 8A:
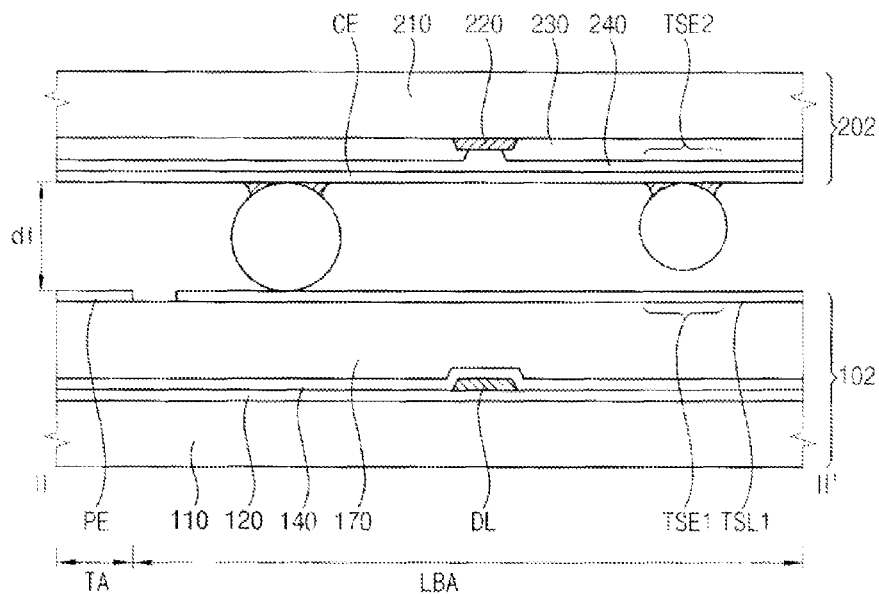
FIG. 8A is a cross-sectional view illustrating a touch screen panel according to another exemplary embodiment of the present invention.

FIG. 8A is a cross-sectional view illustrating a touch screen panel according to another exemplary embodiment of the present invention.

Referring to FIG. 8A, a touch screen panel 503 according to the present exemplary embodiment includes a first touch screen substrate 102 as a lower substrate, a second touch screen substrate 202 as an upper substrate, a liquid crystal layer interposed between the first and second touch screen substrates 102 and 202, insulation balls IB and conductive balls CB.

The first touch screen substrate 102 includes signal lines, such as a data line DL, a passivation layer 140, an organic layer 170, a pixel electrode PE, a first sensor line TSL1 and a first sensing electrode TSE1. The second touch screen substrate 202 includes a black matrix pattern 220, a color filter 230, an over-coating layer 240, a common electrode CE and a second sensing electrode TSE2. The touch screen panel 503 according to the present exemplary embodiment is substantially the same as the touch screen panel 502 according to the exemplary embodiment in FIG. 6, except that the first touch screen substrate 102 includes the organic layer 170 and the second touch screen substrate 202 includes the black matrix pattern 220, the color filter 230, and the over-coating layer 240. Thus, any further repetitive description will be omitted.

The signal lines, the first sensor line TSL1 and the first sensing electrode TSE1 are formed on a first base substrate 110 in a light blocking region LBA of the touch screen panel 502. The pixel electrode PE is formed on the first base substrate 110 in a light transmission region TA. The organic layer 170 is formed on the first base substrate 110 in the light transmission region TA and the light blocking region LBA.

The black matrix pattern 220 is formed on the second base substrate 210 in the light blocking region LBA. The color filter 230 is formed on the second base substrate 210 in the light transmission region TA. The over-coating layer 240 is formed on the second base substrate 210 in the light blocking region LBA and the light transmission region TA.

The second sensing electrode TSE2 is formed on the second base substrate 210 facing the first sensing electrode TSE1 in the light blocking region LBA. The common electrode CE is formed on the second base substrate 210 in the light transmission region TA and the light blocking region LBA except a region corresponding to the second sensing electrode TSE2.

The insulation balls IB makes contact with the common electrode CE. The insulation balls IB are fixed on the second touch screen substrate 202 by a third hardener 30 which is formed around a third contact point between the common electrode CE and each insulation ball IB. The conductive balls CB make contact with the second sensing electrode TSE2. The conductive balls CB are fixed on the second touch screen substrate 202 by a fourth hardener 40 which is formed around a fourth contact point between the second sensing electrode TSE2 and each conductive ball CB.

Hereinafter, a method for manufacturing a touch screen panel 503 according to the present exemplary embodiment will be described, referring to FIGS. 8A and 8B.

Referring to FIG. 8A, the black matrix pattern 220 and the color filter 230 are formed on the second base substrate 210. For example, the black matrix pattern 220 may be formed on the second base substrate 210 in the light blocking region LBA, and the color filter 230 may be formed on the second base substrate 210 in the light transmission region TA, which is divided by the black matrix pattern 220.

The over-coating layer 240 is formed on the second base substrate 210 including the black matrix pattern 220 and the color filter 230. The common electrode CE and the second sensing electrode TSE2 are formed on the over-coating layer 240.

Figure 8B:
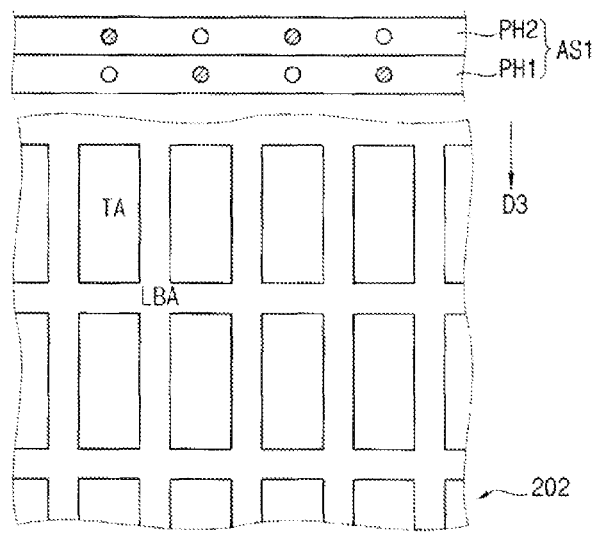
FIG. 8B is a plan view illustrating a touch screen substrate of FIG. 8A.

FIG. 8B is a plan view illustrating a touch screen substrate of FIG. 8A.

Referring to FIG. 8B, a first print assembly AS1 is disposed over the touch screen substrate 202 including the common electrode CE and the second sensing electrode TSE2. The first print assembly AS1 moves over the second touch screen substrate 202 along a third direction D3 to dispose the insulation balls IB and the conductive ball CB on the second touch screen substrate 202.

The insulation balls IB and the conductive balls CB are fixed on the second touch screen substrate 202 via a fixing process. A fixing process according to the present exemplary embodiment is substantially the same as a process according to the exemplary embodiment described in FIGS. 4, 5A and 5B, except that the insulation balls IB and the conductive balls CB are fixed on the second touch screen substrate 202. Thus, any further repetitive description will be omitted.

According to the present exemplary embodiment, the insulation balls IB and the conductive balls CB are need via a single process using first and second inks, simplifying a method of manufacturing the touch screen panel 503 as compared to using a photolithography process. Further, the touch screen panel 503 may easily restore itself to an unpressured state from a pressured state resulting from an application of outer pressure. Therefore, the first and second sensing electrodes TSE1 and TSE2 may easily contact each other, enhancing the touch sensitivity of the touch screen panel 503.

Figure 9:
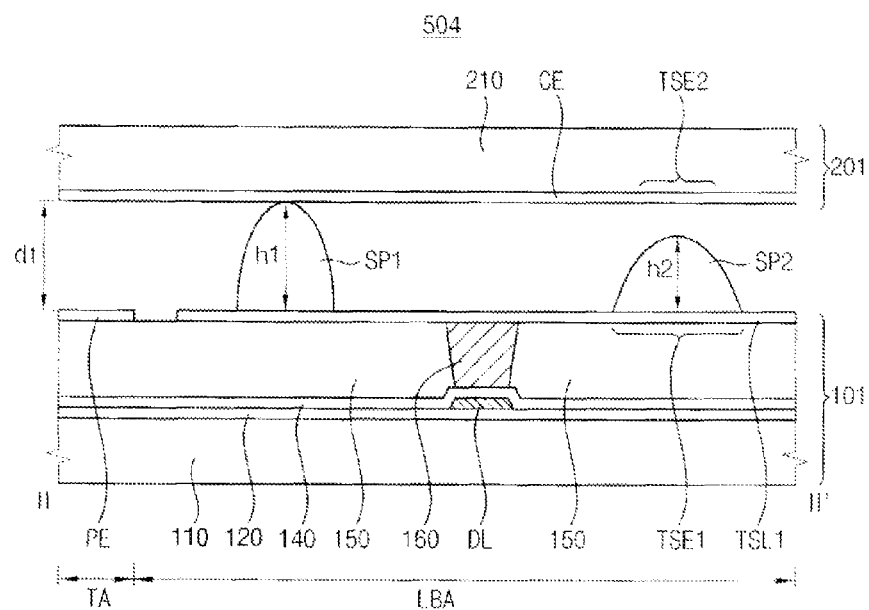
FIG. 9 is a plan view illustrating a touch screen panel manufactured according to another exemplary embodiment of the present invention.

FIG. 9 is a plan view illustrating a touch screen panel manufactured according to another exemplary embodiment of the present invention.

Referring to FIG. 9, a touch screen panel 504 according to the present exemplary embodiment includes a first touch screen substrate 101 as a lower substrate, a second touch screen substrate 201 as an upper substrate, a liquid crystal layer interposed between the first and second touch screen substrates 101 and 201, a first spacer SP1 and a second spacer SP2.

The first touch screen substrate 101 includes signal lines such as a data line DL, a TFT SW, a color filter 150, a black matrix pattern 160, a first sensor line TSL1, a first sensing electrode TSE1 and a pixel electrode PE. The second touch screen substrate 201 includes a second sensing electrode TSE2 and a common electrode CE. The touch screen panel 504 according to the present exemplary embodiment is substantially the same as the touch screen panel 501 according to the exemplary embodiment described in FIGS. 1, 2 and 3, except that the first and second spacers SP1 and SP2 are interposed between the first and second touch screen substrates 101 and 201. Thus, any further repetitive description will be omitted.

The first and second spacers SP1 and SP2 are interposed between a first base substrate 110 and a second base substrate 210 in a light blocking region LBA of the touch screen panel 504. For example, the first and second spacers SP1 and SP2 are both disposed on the first base substrate 110 in the light blocking region LBA.

The first spacer SP1 has a first height $h_1$ and is an insulator. The first height $h_1$ is substantially the same as a cell gap "dt" of the touch screen panel 504. The first spacers SP1 may uniformly maintain the cell gap "dt." The first spacers SP1 may be disposed on the first sensor line TSL1. The first spacers SP1 make contact with the first sensor line TSL1 and the common electrode CE. A first portion of the first spacer SP1 makes contact with the first sensor line TSL1 and a second portion opposite to the first portion of the first spacer SP1 makes contact with the common electrode CE. A cross-section area of the first portion is wider than that of the second portion. Since the first spacer SP1 is an insulator, the first sensor line TSL1 is not electrically connected to the common electrode CE although the first spacers SP1 are interposed between the first sensor line TSL1 and the common electrode CE.

The second spacers SP2 are formed on the first sensing electrode TSE1. The second spacer SP2 has a second height $h_2$ and is a conductor. The second height $h_2$ is less than the first height $h_1$. For example, the second height $h_2$ may be in a range between about 85% and about 95% of the first height $h_1$. Since the second height $h_2$ is less than the first height $h_1$, the second spacer SP2 makes contact with the first sensing electrode TSE1 but is spaced apart from the second sensing electrode TSE2. When an outer pressure is applied to the touch screen panel 504, the second sensing electrode TSE2 contacts the second spacer SP2 so that the first sensing electrode TSE1 becomes electrically connected to the second sensing electrode TSE2. The first and second sensing electrodes TSE1 and TSE2 are electrically connected each other by the second spacer SP2. Therefore, the first and second touch screen substrates 101 and 201 may be electrically connected to each other.

Hereinafter, a method of manufacturing the touch screen panel 504 according to the present exemplary embodiment will be described, referring to FIGS. 9, 10, 11A and 11B.

A method of manufacturing the touch screen panel 504 according to the present exemplary embodiment is substantially the same as a method of manufacturing the touch screen panel 501 according to the exemplary embodiment illustrated in FIG. 4, except for the first and second spacers SP1 and SP2. Thus, any further repetitive description will be omitted.

Figure 10:
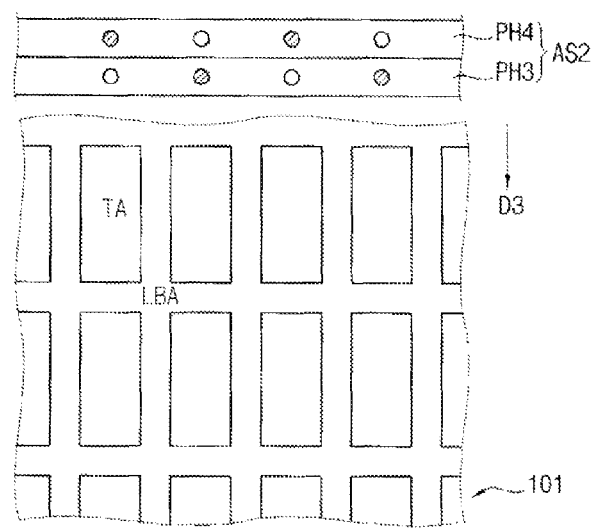
FIG. 10 is a plan view illustrating a method of manufacturing a touch screen substrate of FIG. 9.

FIG. 10 is a plan view illustrating a method of manufacturing a touch screen substrate of FIG. 9.

Referring to FIGS. 9 and 10, a second print assembly AS2 is disposed over the first touch screen substrate 101 including the pixel electrode PE, the first sensor line TSL1 and the first sensing electrode TSE1. The second print assembly AS2 moves over the first touch screen substrate 101 in a third direction D3 to spray a first ink and a second ink onto the first touch screen substrate 101. The amount of sprayed first ink may be substantially the same as that of the second ink. The first ink may be a photo-sensitive insulator and the second ink may be a photo-sensitive conductor. Each of the first and second inks may include oligomers, acrylate carriers, reactive monomers, photo-initiators, etc. The second ink further includes conductive particles, in contrast to the first ink.

The second print assembly AS2 includes a third print head PH3 and a fourth print head PH4. Each of the third and fourth print heads PH3 and PH4 includes a plurality of nozzles, and each of the nozzles may spray the first ink or the second ink onto the first touch screen substrate 101. The third print head PH3 is filled with the first ink, and the fourth print head PH4 is filled with the second ink. An interval between spraying the first ink of the third print head PH3 and spraying the second ink of the fourth print head PH4 is controlled so that the second print assembly AS2 moves over the light transmission region TA and sprays the first and second inks onto the light blocking region LBA.

A nozzle pitch of each of the third and fourth print heads PH3 and PH4 may be defined as a distance between centers of the light transmission regions TA adjacent to each other. When the odd-numbered nozzles of the third print head PH3 are open and the even-numbered nozzles of the third print head PH3 are closed, the first ink is sprayed onto the first touch screen substrate 101. Simultaneously, the even-numbered nozzles of the fourth print head PH4 are open and the odd-numbered nozzles of the fourth print head PH4 are closed, and the second ink is sprayed onto the first touch screen substrate 101. Therefore, the first spacers SP1 or the second spacers SP2 may be arranged in the second direction D2. Alternatively, the first and second spacers SP1 and SP2 may be arranged in a direction crossing the third direction D3.

Hereinafter, a process of forming first and second spacers SP1 and SP2 on the first touch screen substrate 101 by spraying the first and second inks onto the first touch screen substrate 101 will be described in detail, referring to FIGS. 11A and 11B.

Figure 11A:
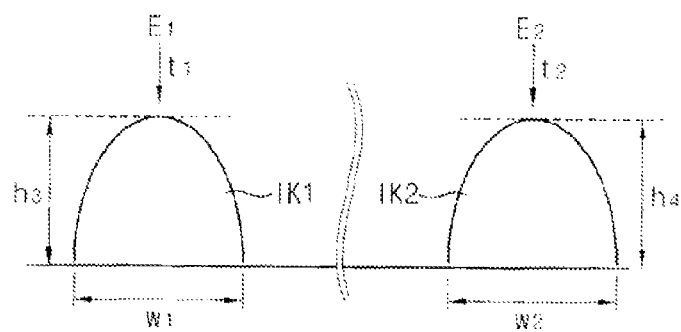
FIGS. 11A and 11B are schematic views illustrating a process for forming a first spacer and a second spacer of FIG. 9.
Figure 11B:
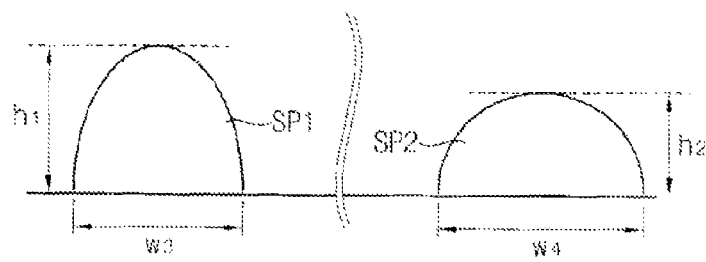

FIGS. 11A and 11B are schematic views illustrating a process for forming a first spacer and a second spacer of FIG. 9.

Referring to FIG. 11A, when the first ink is sprayed onto the first sensor line TSL1 by the third print head PH3, a first ink droplet IK1 has a third height $h_3$ as an initial height and a first width $w_1$ due to the viscosity of the first ink. Similarly, when the second ink is sprayed on the first sensing electrode TSE1 by the fourth print head PH4, a second ink droplet IK2 has a fourth height $h_4$ as an initial height and a second width $w_2$. Since the amount of the first ink sprayed on the first sensor line TSL1 is substantially the same as that of the second ink sprayed on the first sensing electrode TSE1, the third height $h_3$ and the fourth height $h_4$ may be substantially the same and the first and second widths $w_1$ and $w_2$ may be substantially the same.

A first light $E_1$ having a first wavelength is irradiated upon the first ink droplet IK1 during a first period $t_1$. A second light $E_2$ having a second wavelength is irradiated upon the second ink droplet IK2 during a second period $t_2$. The first wavelength may be substantially the same as that of the second wavelength, and the second period $t_2$ is shorter than the first period $t_1$. Therefore, a total amount of energy provided to the first ink droplet IK1 is relatively greater than that provided to the second ink droplet IK2.

Alternatively, the first wavelength may be different from the second wavelength. For example, the first wavelength may be shorter than that of the second wavelength. The first period $t_1$ is substantially the same as the second period $t_2$. Therefore, a total amount of energy provided to the first ink droplet IK1 is relatively greater than that provided to the second ink droplet IK2.

In the present exemplary embodiment, each of the first wavelength and the second wavelength may be in the ultra-violet range of electromagnetic spectrum.

Referring to FIG. 11B, the first light $E_1$ is irradiated upon the first ink droplet IK1 during the first period $t_1$ to form the first spacer SP1 having the first height $h_1$. The first height $h_1$ may be substantially the same as the third height $h_3$. Here, the third width $w_3$ may be substantially the same as the first width $w_1$. Alternatively, the first height $h_1$ may be less than the third height $h_3$, and the third width $w_3$ may be wider than the first width $w_1$.

The second light $E_2$ is irradiated upon the second ink droplet IK2 during the second period $t_2$ to form the second spacer SP2 having the first height $h_2$. The second height $h_2$ is lower than the first height $h_1$. In addition, the second height $h_2$ is lower than the third height $h_3$. Here, the fourth width $w_4$ is wider than the second width $w_2$, and the fourth width $w_4$ is wider than the third width $w_3$.

Since the second ink droplet IK2 is provided with less energy than the first ink droplet IK1, the second ink droplet IK2 hardens after being spread on the first sensing electrode TSE1, decreasing its height from the fourth height $h_4$ to the second height $h_2$. Thus, the second spacer SP2 comes to have the second height $h_2$. In contrast, the first ink droplet IK1 may harden for a shorter period so that the first spacer SP1 may have the third height $h_3$. Alternatively, the first spacer SP1 may have the first height $h_1$ if the first ink droplet IK1 hardens before the first ink droplet IK1 decreases in height.

Then, after liquid crystals are disposed on the first touch screen substrate 101 including the first and second spacers SP1 and SP2, the first touch screen substrate 101 is combined with the second touch screen substrate 201 including the common electrode CE and the second sensing electrode TSE2. Accordingly, the touch screen panel 504 according to the present exemplary embodiment is manufactured.

According to the present exemplary embodiment, although the amount of the first ink is substantially the same as that of the second ink, the first and second inks have different properties, so that the amount of energy applied to each droplet may be adjusted to easily form the first and second spacers SP1 and SP2. The process of forming the first and second spacers SP1 and SP2 includes simultaneously spraying the first and second inks by the second print assembly AS2 and irradiating light upon the first and second inks to simplify a method of manufacturing the touch screen panel 504.

In addition, neither the first sensor line TSL1 nor the common electrode CE will contact the first spacer without first patterning the first sensor line TSL1 and the common electrode CE.

The light may be irradiated via a single process including moving a first light source and a second light source along the third direction D3. The first and second light sources irradiate light having different wavelengths. In addition, the light may be irradiated via a simple process that includes adjusting durations by which the light is irradiated to the first and second ink droplets IK1 and IK2 using the same light source.

Figure 12:
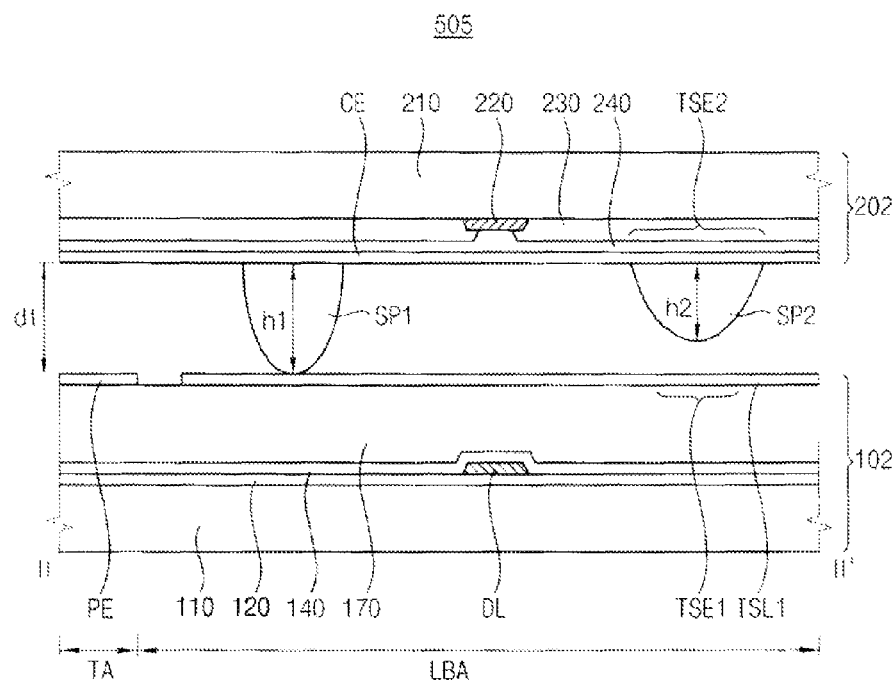
FIG. 12 is a cross-sectional view illustrating a touch screen panel manufactured according to another exemplary embodiment of the present invention.

FIG. 12 is a cross-sectional view illustrating a touch screen panel manufactured according to another exemplary embodiment of the present invention.

Referring to FIG. 12, a touch screen panel 505 according to the present exemplary embodiment includes a first touch screen substrate 102 as a lower substrate, a second touch screen substrate 202 as an upper substrate, a liquid crystal layer interposed between the first and second touch screen substrates 102 and 202, a first spacer SP1 and a second spacer SP2.

The first touch screen substrate 102 includes signal lines such as a data line DL, a passivation layer 140, an organic layer 170, a pixel electrode PE, a first sensor line TSL1 and a first sensing electrode TSE1. The second touch screen substrate 202 includes a black matrix pattern 220, a color filter 230, an over-coating layer 240, a common electrode CE and a second sensing electrode TSE2. The touch screen panel 505 according to the present exemplary embodiment is substantially the same as the touch screen panel 503 according to the exemplary embodiment illustrated in FIG. 8A except for including the first and second spacers SP1 and SP2. Thus, any further repetitive description will be omitted.

The first spacer SP1 is formed on the common electrode CE. The first spacer SP1 has a first height $h_1$ and is an insulator. The first height $h_1$ is substantially the same as a cell gap "dt" of the touch screen panel 505. The first spacer SP1 may uniformly maintain the cell gap "dt." The first spacer SP1 may be disposed on the first sensor line TSL1. The first spacer SP1 according to the present exemplary embodiment is substantially the same as the first spacer SP1 according to the exemplary embodiment illustrated in FIG. 9, except that a first portion of the first spacer SP1 makes contact with the common electrode CE and a second portion opposite to the first portion of the first spacer SP1 makes contact with the first sensor line TSL1, and a cross-section area of the first portion is wider that that of the second portion. Thus, any further repetitive description will be omitted.

The second spacer SP2 is formed on the second sensing electrode TSE2. The second spacer SP1 has a second height $h_2$ and is a conductor. The second height $h_2$ is lower than the first height $h_1$. The second spacer SP2 according to the present exemplary embodiment is substantially the same as the second spacer SP2 according to the exemplary embodiment illustrated in FIG. 9 except that the second spacer SP2 is formed on the second sensing electrode TSE2. Thus, any further repetitive description will be omitted.

Hereinafter, a method of manufacturing the touch screen panel 505 according to the present exemplary embodiment will be described, referring to FIGS. 12 and 13.

Figure 13:
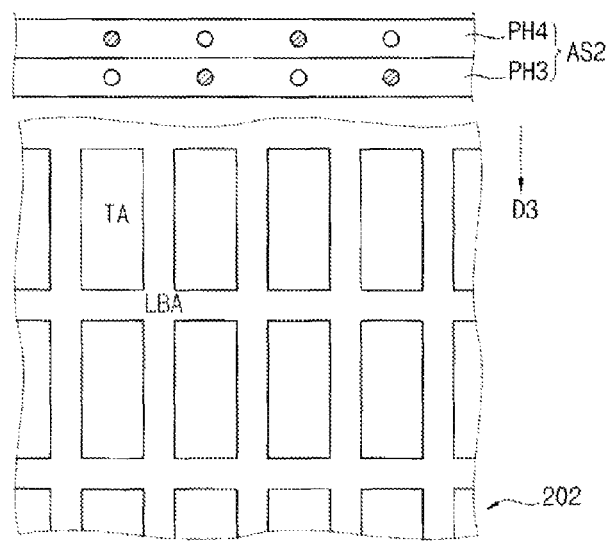
FIG. 13 is a plan view illustrating a method of manufacturing a touch screen substrate of FIG. 12.

FIG. 13 is a plan view illustrating a method of manufacturing a touch screen substrate of FIG. 12.

Referring to FIG. 13, a second print assembly AS2 is disposed over the second touch screen substrate 202 including the second sensing electrode TSE2 and the common electrode CE. The second print assembly AS2 moves over the second touch screen substrate 202 in a third direction. D3 so that a first ink and a second ink are sprayed onto the second touch screen substrate 202. An amount of the sprayed first ink may be substantially the same that of the second ink. The first ink may be a photo-sensitive insulator and the second ink may be a photo-sensitive conductor.

A process for forming the first and second spacers SP1 and SP2 according to the present exemplary embodiment is substantially the same as the process according to the exemplary embodiment described in FIGS. 11A and 11B, except for the first and second spacers SP1 and SP2 are formed on the second touch screen substrate 202. Thus, any further repetitive description will be omitted.

After liquid crystals are disposed on the second touch screen substrate 202 including the first and second spacers SP1 and SP2, the second touch screen substrate 202 is combined with the first touch screen substrate 102 including the pixel electrode PE, the first sensing electrode TSE1 and the first sensor line TSL1. Accordingly, the touch screen panel 505 according to the present exemplary embodiment is manufactured.

Figure 14:
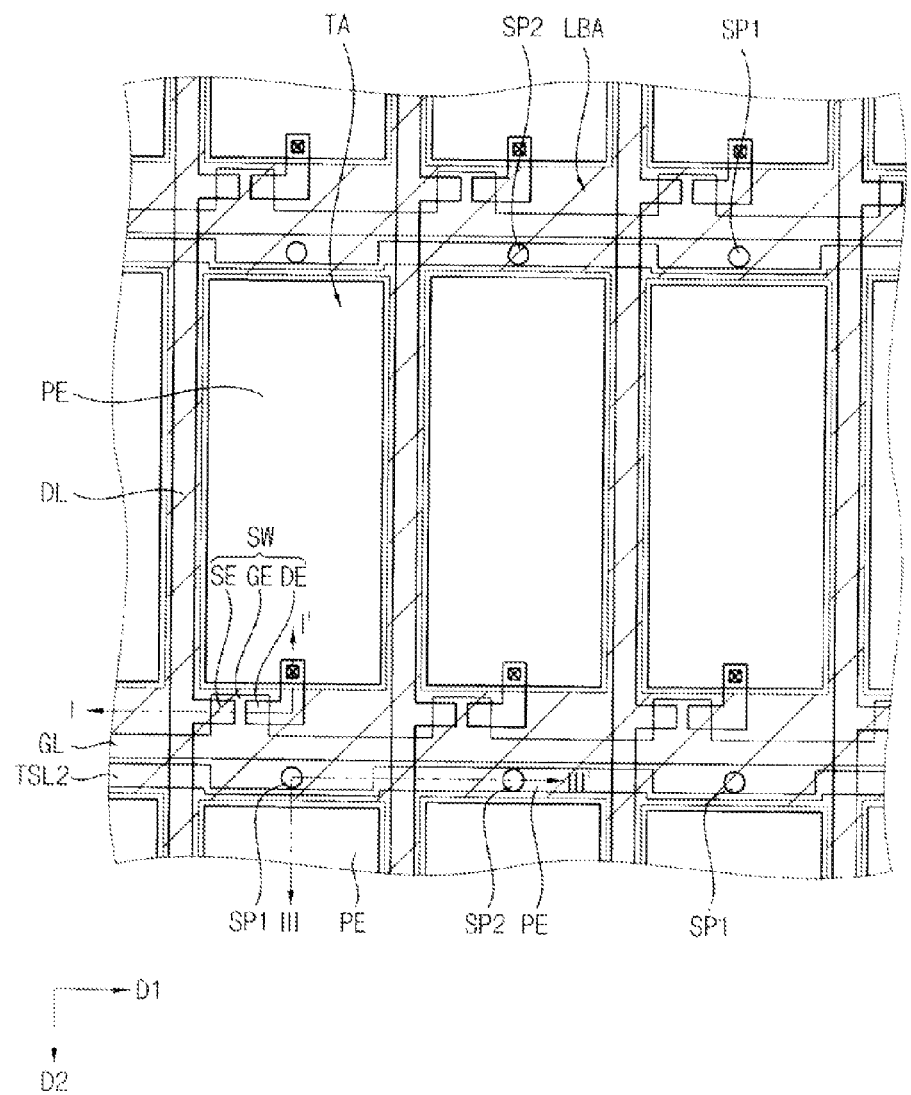
FIG. 14 is a plan view illustrating a touch screen panel manufactured according to another exemplary embodiment of the present invention.
Figure 15:
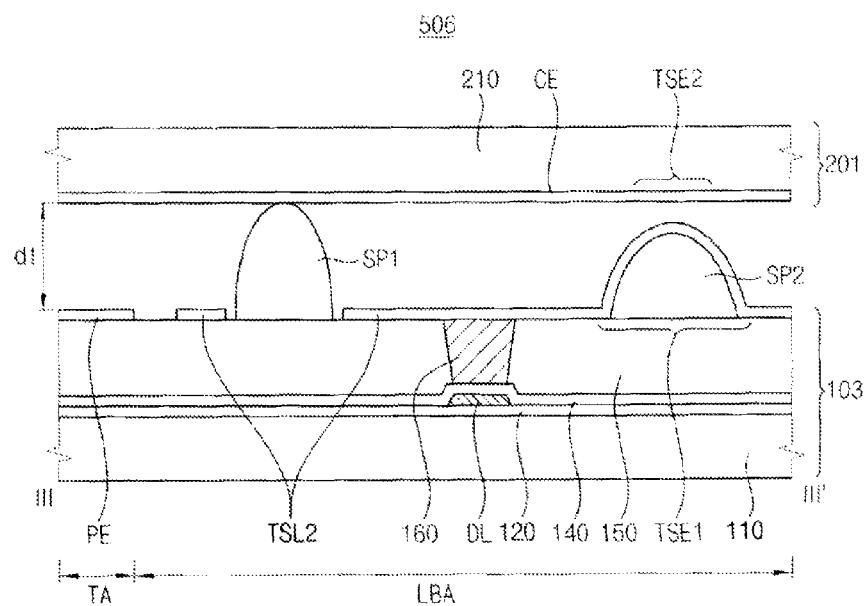
FIG. 15 is a cross-sectional view taken along a line of FIG. 14.

FIG. 14 is a plan view illustrating a touch screen panel manufactured according to still another exemplary embodiment of the present invention. FIG. 15 is a cross-sectional view taken along a line III-III' of FIG. 14.

Referring to FIGS. 14 and 15, a touch screen panel 506 according to the present exemplary embodiment includes a first touch screen substrate 103 as a lower substrate, a second touch screen substrate 201 as an upper substrate, and a liquid crystal layer interposed between the first and second touch screen substrates 103 and 201. The first and second touch screen substrates 103 and 201 are uniformly spaced apart from each other.

The first touch screen substrate 103 includes a first base substrate 110, signal lines such as a gate line GL and a data line DL, a TFT SW, a color filter 150, a black matrix pattern 160, a first spacer SP1, a second sensor line TSL2, a second spacer SP2, a first sensing electrode TSE1 and a pixel electrode PE. The first touch screen substrate 103 according to the present exemplary embodiment is substantially the same as the first touch screen substrate 101 according to the exemplary embodiment illustrated in FIG. 1, except for the first spacer SP1, the second sensor line TSL2, the second spacer SP2 and the first sensing electrode TSE1. Thus, any further repetitive description will be omitted.

The second sensor line TSL2 may be formed on the black matrix pattern 160. The second sensor line TSL2 is connected to the first sensing electrode TSE1. The second sensor line TSL2 extends in a first direction D1 and is spaced apart from the gate line GL in a second direction D2. The second sensor line TSL2 does not overlap with the first spacer SP1. For example, when viewed in a plane, the second sensor line TSL2 has a rectangular shape extending in the first direction D1, and the extending direction of the second sensor line TSL2 shifts in the second direction D2 in a region about the first spacer SP1 and extends again in the first direction D1. Alternatively, the second sensor line TSL2 may have a rectangular shape extending in the first direction D1 with a hole exposing the first spacer SP1.

The first and second spacers SP1 and SP2 are formed on the first base substrate 110 in a light blocking region LBA of the touch screen panel 506. In other embodiments, most of the first and second spacers SP1 and SP2 are formed on the color filter 150 which is disposed on a portion of the light blocking region LBA and a light transmission region TA. Here, the first spacer SP1 may contact the color filter 150 and the common electrode CE. The second spacer SP2 is formed on the color filter 150 in the light blocking region LBA, and the first sensing electrode TSE1 is formed on the second spacer SP2. Alternatively, the first and second spacers SP1 and SP2 may be formed on the black matrix pattern 160 so that the first spacer SP1 may contact the black matrix pattern 160 and the first sensing electrode TSE1 may be formed on the second spacer SP2 disposed on the black matrix pattern 160.

The first spacer SP1 has a first height $h_1$ and is an insulator. The first height $h_1$ is substantially the same as a cell gap "dt" of the touch screen panel 506. The first spacer SP1 may uniformly maintain the cell gap "dt." The first spacer SP1 is substantially the same as the first spacer SP1 illustrated in FIG. 9, except that the first spacer SP1 does not overlap with the second sensor line TSL2. Thus, any further repetitive description will be omitted.

The second spacer SP2 has a second height $h_2$ and is an insulator. The second height $h_2$ is lower than the first height $h_1$. The second spacer SP2 is formed on the first base substrate 110 and is spaced apart from the second touch screen substrate 201. When an outer pressure is applied to the touch screen panel 506, the first sensing electrode TSE1 formed on the second spacer SP2 may contact the second sensing electrode TSE2. Since the second spacer SP2 has is an insulator, the second spacer SP itself does not contact the second touch screen substrate 201. However, the first sensing electrode TSE1 formed on the second spacer SP2 does contact the second sensing electrode TSE2 to electrically connect the first and second touch screen substrates 103 and 201 to each other.

The second touch screen substrate 201 according to the present exemplary embodiment is substantially the same as the second touch screen substrate 201 according to the exemplary embodiment illustrated in FIG. 3. Thus, any further repetitive description will be omitted.

Hereinafter, a method for manufacturing the touch screen panel 506 according to the present exemplary embodiment will be described, referring to FIGS. 14, 15 and 16.

Referring to FIGS. 14 and 15, the gate line GL, a gate insulating layer 120, the data line DL, a passivation layer 140, the color filter 150 and the black matrix pattern 160 are sequentially formed on the first base substrate 110.

The first and second spacers SP1 and SP2 are formed on the first base substrate 110 including the color filter 150 and the black matrix pattern 160. Hereinafter, the first base substrate 110 including the color filter 150 and the black matrix pattern 160 is referred to as the "first pre-screen substrate 104."

Figure 16:
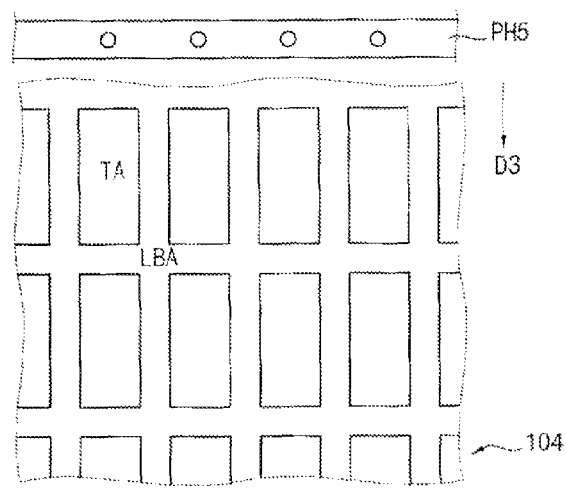
FIG. 16 is a plan view illustrating a method of manufacturing a touch screen substrate of FIG. 15.

FIG. 16 is a plan view illustrating a method for manufacturing a first touch screen substrate of FIG. 15.

Referring to FIG. 16, a fifth print head PH5 is disposed over the first pre-screen substrate 104. The fifth print head PH5 moves over the first pre-screen substrate 104 in a third direction D3 to spray a third ink onto the first pre-screen substrate 104. The fifth print head PH5 includes a plurality of nozzles, and a nozzle pitch of the nozzles may be substantially the same as a distance between centers of adjacent light transmission regions TA. After opening all of the nozzles, the third ink may be sprayed onto the first pre-screen substrate 104. Therefore, the third ink may be sprayed in a forming region of the first spacer SP1 and a forming region of the second spacer SP2 of the first pre-screen substrate 104. An amount of the third ink sprayed in the forming region of the first spacer SP1 may be substantially the same as that sprayed on the forming region of the second spacer SP2.

A third ink droplet (not shown) of the third ink sprayed onto the first pre-screen substrate 104 is hardened by light. An intensity of a first light irradiated upon the first spacer SP1 forming region is different from an intensity of a second light irradiated upon the second spacer SP2 forming region. For example, the first intensity may be stronger than the second intensity. Methods of adjusting the first and second intensities of radiation according to the present exemplary embodiment are substantially the same as the methods according to the exemplary embodiment described in FIGS. 11A and 11B, except that the light is irradiated upon the third ink droplet. Thus, any further repetitive description will be omitted. Therefore, the first and second spacers SP1 and SP2 having differing heights are formed on the first pre-screen substrate 104.

Referring to FIG. 15 again, a transparent electrode layer is formed on the first pre-screen substrate 104 including the first and second spacers SP1 and SP2. The transparent electrode layer is patterned to form the pixel electrode PE, the second sensor line TSL2 and the first sensing electrode TSE1. Thus, the first touch screen substrate 103 of the touch screen panel 506 according to the present exemplary embodiment is manufactured.

Then, after liquid crystals are disposed on the first touch screen substrate 103, the first touch screen substrate 103 may be combined with the second touch screen substrate 201 including the common electrode CE and the second sensing electrode TSE2. Accordingly, the touch screen panel 506 according to the present exemplary embodiment is manufactured. According to the present exemplary embodiment of the present invention, first and second spacers SP1 and SP2 with differing heights may be easily formed.

Figure 17:
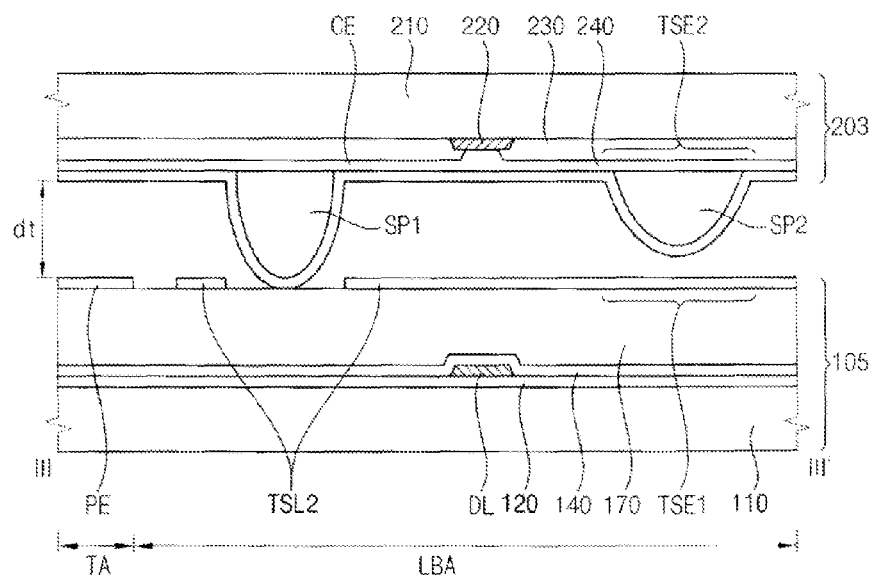
FIG. 17 is a cross-sectional view illustrating a touch screen panel manufactured according to another exemplary embodiment of the present invention.

FIG. 17 is a cross-sectional view illustrating a touch screen panel manufactured according to still another exemplary embodiment of the present invention.

Referring to FIG. 17, a touch screen panel 507 includes a first touch screen substrate 105 as a lower substrate, a second touch screen substrate 203 as an upper substrate, and a liquid crystal layer interposed between the first and second touch screen substrates 105 and 203.

The first touch screen substrate 105 includes a first base substrate 110, signal lines such as a data line DL, a second sensor line TSL2, a first sensing electrode TSE1 and a pixel electrode PE. The first touch screen substrate 105 according to the present exemplary embodiment is substantially the same as the first touch screen substrate 102 according to the exemplary embodiment illustrated in FIG. 8A, except for the second sensor line TSL2. The second sensor line TSL2 according to the present exemplary embodiment is substantially the same as the second sensor line TSL2 according to the exemplary embodiment illustrated in FIGS. 14 and 15. Thus, any further repetitive description will be omitted.

The second touch screen substrate 203 includes a second base substrate 210, a black matrix pattern 220, a color filter 230, an over-coating layer 240, a first spacer SP1, a second spacer SP2, a common electrode CE, and a second sensing electrode TSE2. The second touch screen substrate 203 according to the present exemplary embodiment is substantially the same as the second touch screen substrate 202 according to the exemplary embodiment illustrated in FIG. 8B, except that the second touch screen substrate 203 includes the first and second spacers SP1 and SP2. Thus, any further repetitive description will be omitted. The first and second spacers SP1 and SP2 are formed on the second base substrate 210 in a light blocking region LBA.

The first spacer SP1 has a first height $h_1$ and is an insulator. The first height $h_1$ is substantially the same as a cell gap "dt" of the touch screen panel 507. The first spacer SP 1 may uniformly maintain the cell gap "dt." The first spacer SP1 according to the present exemplary embodiment is substantially the same as the first spacer SP1 according to the exemplary embodiment illustrated in FIGS. 14 and 15, except that the first spacer SP1 is formed on the second substrate 210. Thus, any further repetitive description will be omitted.

The second spacer SP2 has a second height $h_2$ and is an insulator. The second height $h_2$ is lower than the first height $h_1$. The second spacer SP2 is formed on the second base substrate 210 and is spaced apart from the first touch screen substrate 105. When an outer pressure is applied to the touch screen panel 507, the second sensing electrode TSE2 formed on the second spacer SP2 may contact the first sensing electrode TSE1. Since the second spacer SP2 is an insulator, the second spacer SP itself does not connect the first touch screen substrate 105 with the second touch screen substrate 203. However, the second sensing electrode TSE2 formed on the second spacer SP2 does contact the first sensing electrode TSE1 to electrically connect the first and second touch screen substrates 105 and 203 to each other.

Hereinafter, a method for manufacturing the touch screen panel 507 according to the present exemplary embodiment will be described, referring to FIGS. 17 and 18.

Referring to FIG. 17, the color filter 230, the black matrix pattern 220 and the over-coating layer 240 are sequentially formed on the second base substrate 210. The first and second spacers SP1 and SP2 are formed on the second base substrate 210 including the over-coating layer 240. Hereinafter, the second base substrate 210 including the over-coating layer 240 is referred to as the "second pre-screen substrate 204."

Figure 18:
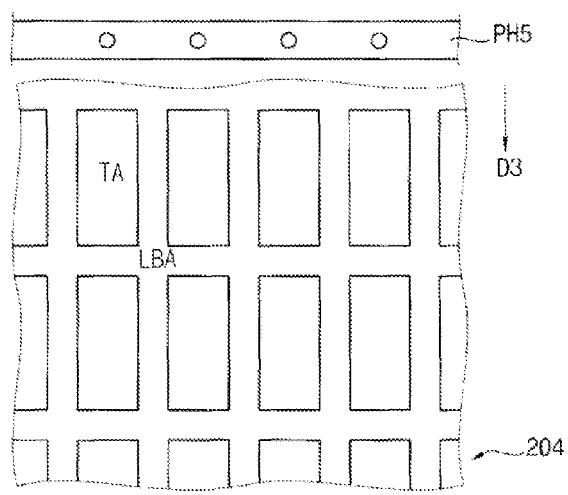
FIG. 18 is a plan view illustrating a method of manufacturing a touch screen substrate of FIG. 17.

FIG. 18 is a plan view illustrating a method of manufacturing a touch screen substrate of FIG. 17.

Referring to FIG. 18, a fifth print head PH5 is disposed over the second pre-screen substrate 204. The fifth print head PH5 moves over the second pre-screen substrate 204 in a third direction D3 to spray a third ink onto the second pre-screen substrate 204. A third ink droplet (not shown) sprayed on the second pre-screen substrate 204 hardens to form the first and second spacers SP1 and SP2. A process for forming the first and second spacers SP1 and SP2 according to the present exemplary embodiment is substantially the same as the process according to the exemplary embodiment described in FIG. 16, except that the first and second spacers SP1 and SP2 are formed on the second pre-screen substrate 204. Thus, any further repetitive description will be omitted.

Again referring to FIG. 17, the common electrode CE and the second sensing electrode TSE2 are formed on the second pre-screen substrate 204 including the first and second spacers SP1 and SP2. Thus, the second touch screen substrate 203 of the touch screen panel 507 according to the present exemplary embodiment is manufactured.

Then, after liquid crystals are disposed on the second touch screen substrate 203, the second touch screen substrate 203 may be combined with the first touch screen substrate 105 including the pixel electrode PE, the second sensor line TSL2 and the first sensing electrode TSE1. Accordingly, the touch screen panel 507 according to the present exemplary embodiment is manufactured. According to the present exemplary embodiment of the present invention, the first and second spacers SP1 and SP2 with differing heights may be easily formed.

Figure 19:
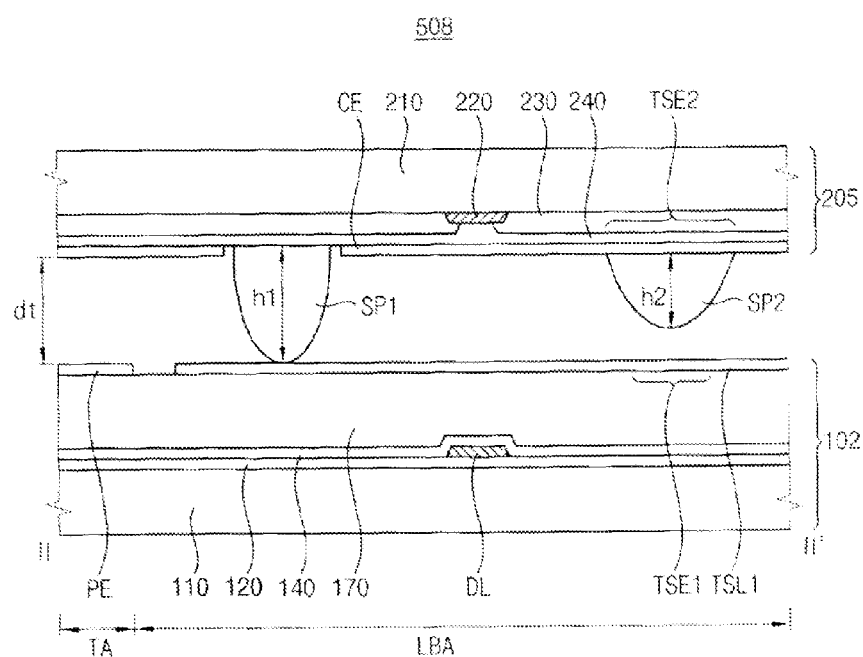
FIG. 19 is a cross-sectional view illustrating a touch screen panel manufactured according to another exemplary embodiment of the present invention.

FIG. 19 is a cross-sectional view illustrating a touch screen panel manufactured according to still another exemplary embodiment of the present invention.

Referring to FIG. 19, a touch screen panel 508 according to the present exemplary embodiment includes a first touch screen substrate 102 as a lower substrate, a second touch screen substrate 205 as an upper substrate, and a liquid crystal layer interposed between the first and second touch screen substrates 102 and 205.

The first touch screen substrate 102 includes signal lines such as a data line DL, a passivation layer 140, an organic layer 170, a pixel electrode PE, a first sensing electrode TSE1 and a first sensor line TSL1. The first touch screen substrate 102 according to the present exemplary embodiment is substantially the same as the first touch screen substrate 102 according to the exemplary embodiment illustrated in FIG. 8A. Thus, any further repetitive description will be omitted.

The second touch screen substrate 205 includes a second base substrate 210, a black matrix pattern 220, a color filter 230, an over-coating layer 240, a common electrode CE, a second sensing electrode TSE2, a first spacer SP1 and a second spacer SP2. The second touch screen substrate 205 according to the present exemplary embodiment is substantially the same as the second touch screen substrate 203 according to the exemplary embodiment illustrated in FIG. 17 except the common electrode CE. Thus, any further repetitive description will be omitted.

The common electrode CE includes a hole exposing the first spacer SP1. If the first sensor line TSL1 extends in the first direction D1 as illustrated in FIG. 1 and the common electrode CE is formed on the first spacer SP1, the common electrode CE will be connected to the first sensor line TSL1 by the first spacer SP1. In contrast, if the common electrode CE includes a hole, the common electrode CE will be electrically separated from the first sensor line TSL1 even though the first spacer SP1 makes contact with the common electrode CE and the first sensor line TSL1.

Hereinafter, a method of manufacturing the touch screen panel 508 according to the present exemplary embodiment will be described, referring to FIGS. 19 and 20.

Referring to FIG. 19, the black matrix pattern 220, the color filter 230 and the over-coating layer 240 are formed on the second base substrate 210. Hereinafter, the second base substrate 210 including the over-coating layer 240 is referred to as the "third pre-screen substrate 206."

Figure 20:
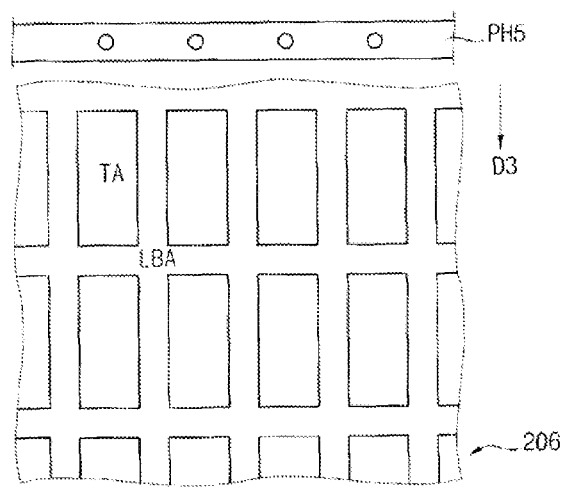
FIG. 20 a plan view illustrating a method of manufacturing a touch screen substrate of FIG. 19.

FIG. 20 a plan view illustrating a method of manufacturing a second touch screen substrate of FIG. 19.

Referring to FIG. 20, a fifth print head PH5 is disposed over the third pre-screen substrate 206. The fifth print head PH5 moves over the third pre-screen substrate 206 in a third direction D3 to spray a third ink onto the third pre-screen substrate 206. A third ink droplet (not shown) sprayed on the third pre-screen substrate 206 hardens to form the first and second spacers SP1 and SP2. A process for forming the first and second spacers SP1 and SP2 according to the present exemplary embodiment is substantially the same as the process according to the exemplary embodiment described in FIG. 16, except that the first and second spacers SP1 and SP2 are formed on the third pre-screen substrate 206. Thus, any further repetitive description will be omitted.

Referring again to FIG. 19, a transparent electrode layer is formed on the third pre-screen substrate 206 including the first and second spacers SP1 and SP2. The transparent electrode layer is patterned to form the common electrode CE including the hole and the second sensing electrode TSE2. The hole of the common electrode CE exposes the first spacer SP1. Thus, the second touch screen substrate 205 of the touch screen panel 508 according to the present exemplary embodiment is manufactured.

Then, after liquid crystals are disposed on the second touch screen substrate 205, the second touch screen substrate 205 may be combined with the first touch screen substrate 102 including the pixel electrode PE, the first sensor line TSL1 and the first sensing electrode TSE1. Accordingly, the touch screen panel 508 according to the present exemplary embodiment is manufactured. According an exemplary embodiment of the present invention, the first and second spacers SP1 and SP2 with differing heights may be easily formed.

According to embodiments of the present invention, the cell gap spacer and the touch spacer for sensing an outer pressure are formed via the same process to improve manufacturing productivity of a touch screen panel. In addition, using spherically shaped insulation balls and conductive balls for the cell gap spacers and the touch spacers enhances the touch sensitivity of the touch screen panel.

The foregoing is illustrative of embodiments of the present invention and is not to be construed as limiting thereof. Although a few exemplary embodiments of the present invention have been described, those skilled in the art will readily appreciate that many modifications are possible in exemplary embodiments without materially departing from the novel teachings of exemplary embodiments of the present invention. Accordingly, all such modifications are intended to be included within the scope of exemplary embodiments of the present invention as defined in the claims. Therefore, it is to be understood that the foregoing is illustrative of embodiments of the present invention and is not to be construed as limited to the specific exemplary embodiments disclosed, and that modifications to the disclosed exemplary embodiments, as well as other exemplary embodiments, are intended to be included within the scope of the appended claims. Embodiments of the present invention are defined by the following claims, with equivalents of the claims to be included therein.

What is claimed is:

1. A method of manufacturing a touch screen substrate, the method comprising:

forming a sensing electrode and a sensor line on a substrate;

spraying a first ink on the sensor line formed on the substrate and a second ink on the sensing electrode formed on the substrate, the first ink including a first solvent and insulation balls having a first diameter, the second ink including a second solvent and conductive balls having a second diameter smaller than the first diameter; and hardening the first and second inks on the substrate, to fix the insulation balls on the sensor line formed on the substrate and the conductive balls on the sensing electrode formed on the substrate.

2. The method of claim 1, wherein the first and second inks are sprayed from an assembly including a first print head filled with the first ink and a second print head filled with the second ink, and wherein the assembly moves over the substrate to spray the first and second inks.

3. The method of claim 1, wherein hardening the first and second inks sprayed on the substrate comprises:

partially evaporating the first solvent and hardening the first ink to form a first hardener around a first contact point between the insulation ball and the sensor line; and partially evaporating the second solvent and hardening the second ink to form a second hardener around a second contact point between the conductive ball and the sensing electrode.

4. The method of claim 1, wherein the sensing electrode and the sensor line are formed in a light blocking region surrounding a light transmission region of the substrate; and wherein the method further comprises forming a pixel electrode separated from the sensing electrode in the light transmission region of the substrate.

5. The method of claim 1, wherein the sensing electrode is formed in a light blocking region surrounding a light transmission of the substrate; and wherein the method further comprises forming a common electrode on a substrate spaced apart from the substrate having the sensing electrode; the common electrode being connected to the sensing electrode in the light transmission region.

* * * * *